Aug. 31, 1954  F. P. PALLOTTI  2,687,577
POCKET COMPASS
Filed Sept. 3, 1952
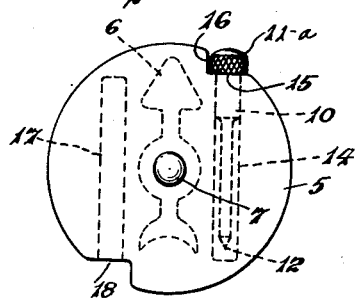
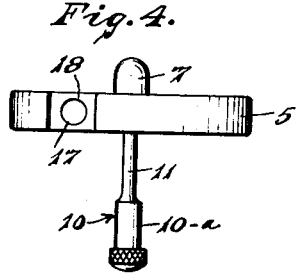
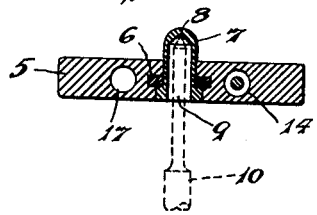
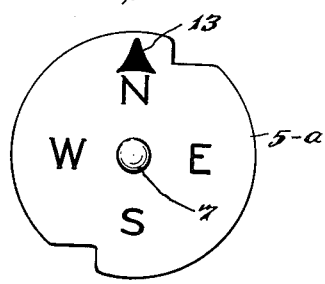
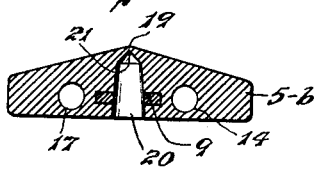
INVENTOR.
FRANCIS P. PALLOTTI.
BY
Louis V. Lucia
ATTORNEY.

Patented Aug. 31, 1954

2,687,577

UNITED STATES PATENT OFFICE 2,687,577

POCKET COMPASS

Francis P. Pallotti, Hartford, Conn.

Application September 3, 1952, Serial No. 307,620

4 Claims. (Cl. 33—222)

This invention relates to a pocket compass and more particularly to a compass which can be readily assembled for use and easily disassembled for being conveniently carried in a pocket.

An object of this invention is to provide a simple and inexpensive compass comprising a dial member and a separable staff which is securely carried in the dial member when not in use.

A still further object of the invention is to provide a compass which can be manufactured from a plastic material at a minimum of cost so that it may be used as a premium or advertising novelty.

Further objects and advantages of this invention will be more clearly understood from the following description and from the accompanying drawings in which:

Fig. 1 is a plan view of a compass embodying my invention.

Fig. 2 is a side view of said compass in central vertical section.

Fig. 3 is a plan view showing indicia which may be provided upon the surface of the dial member.

Fig. 4 is a side view of the said compass as assembled for use.

Fig. 5 is a side view in central vertical section showing a modified form of the dial member embodying my invention.

As shown in the accompanying drawings, the numeral 5 denotes a disc-shaped dial member which is preferably constructed of plastic material and has a magnetic needle, in the form of a pointer 6, preferably embedded therein. A pivot member 7 extends through the said pointer and has a conical bearing point 8 at the bottom of an inverted recess 9 therein which is co-axial with the dial member.

A staff 10 is provided with said dial as a separate member and has a shank portion 11, which loosely fits within the recess 9, and a point 12 at the end of the said shank for engaging the bearing point 8 to rotatably support the dial member. It is noted that the bearing point 8 is disposed at a plane above the top of the dial member so that, when supported upon the end of the staff, as shown in Fig. 2, the said dial will hang from the said bearing point and be easily rotated by the magnetic pointer 6 to indicate the direction of North.

In the form shown in Fig. 1, the dial 5 may be of transparent material so that the pointer 6 may be visible to clearly show the direction of magnetic North during the use of the compass. In the form illustrated in Fig. 3, the dial 5-a may be constructed of opaque material having indicia 13 denoting the pointer which is associated with the embedded magnetized member for indicating North, together with other indicia for indicating North, East, South and West, which is provided upon the top surface of the said dial member.

If desired, this indicia may be placed, with relation to the magnetic needle embedded in the dial member, so as to indicate true North.

The said dial member 5 is provided with a staff-receiving chamber in the form of an elongated bottomed recess 14 which extends transversely to the axis of the dial member and opens at the flat side 15 of a notch 16 in the edge of the said dial member. A similar recess 17 and notch 18 are provided at the opposite side of the said dial member in order to balance it during the use thereof and while it is mounted upon the end of the staff 10.

After the use of the compass, the staff is simply inserted into the recess 14 and the head 11-a of the staff will rest in the notch 16 so that it may be easily grasped when the staff is to be pulled out of the recess. Also, the enlarged portion 10-a of the staff will fit snugly within the recess 14 and securely retain the staff in the dial while the compass is not in use.

In the form illustrated in Fig. 5, the pivot member 7 is eliminated and the dial 5-b is formed as a unitary member with a conical portion 19 into which the recess 20 extends to locate the bearing point 21 on a plane above the upper edge of the dial to permit suspension of said dial upon the end of the staff in the same manner as the dial 5 is suspended by the use of the pivot member 7.

I claim:

1. A pocket compass comprising a dial member carrying a magnetic needle and having a co-axial recess therein with a bearing point in said recess located above the general plane of the dial member; said dial having a separate recess in one side thereof adapted to contain a supporting staff therein when the compass is not in use, and a similar transverse recess in the opposite side thereof for balancing said dial member during the use thereof.

2. A pocket compass comprising a dial member, a magnetic needle embedded within said dial member, a pivot member co-axial with said dial member and extending above the surface thereof, the said pivot member having a recess therein with a bearing point located above the general plane of the dial member; the said dial having a transverse recess at one side of its axis extending thereinto through the free edge thereof and adapted to contain a supporting staff while the compass is not in use, and a separate recess at the opposite side of said axis for balancing the dial while mounted upon the staff.

3. A pocket compass including a dial member; the said dial member having a co-axial recess therein, a bearing point in said recess located above the general plane of the dial member, a pair of oppositely disposed notches in the free edge of said dial member, and a recess extending into the said dial member from a side of each of said notches and disposed at opposite sides of the axis of said dial member.

4. A pocket compass including a dial member having a conical upper surface, a magnetic member embedded within the said dial member; the said dial member having an inverted recess co-axial therewith and extending from the bottom thereof through the said magnetic member, a co-axial bearing point in said recess located above the general plane of the dial member and a pair of recesses extending into the free edge of said dial member and disposed at opposite sides of the axis thereof to provide a storage compartment therein and to balance said member.

References Cited in the file of this patent

UNITED STATES PATENTS

| Number | Name | Date |
|---|---|---|
| Re. 10,991 | Sireix | Mar. 26, 1889 |
| 811,248 | Saegmuller | Jan. 30, 1906 |
| 1,961,066 | Mix | May 29, 1934 |

FOREIGN PATENTS

| Number | Country | Date |
|---|---|---|
| 576,370 | France | May 10, 1924 |
| 532,973 | Great Britain | Feb. 4, 1941 |
| 599,112 | Great Britain | Mar. 4, 1948 |